(12) United States Patent
Kudva et al.

(10) Patent No.: US 9,708,136 B2
(45) Date of Patent: Jul. 18, 2017

(54) LIQUID-EJECTING BEARINGS FOR TRANSPORT OF GLASS SHEETS

(75) Inventors: Gautam Narendra Kudva, Horseheads, NY (US); Weiwei Luo, Painted Post, NY (US); Yoshihiro Nakamura, Iwata (JP); Tetsuzou Yamada, Mankinohara (JP)

(73) Assignee: Corning Incorporated, Corning, NY (US)

( * ) Notice: Subject to any disclaimer, the term of this patent is extended or adjusted under 35 U.S.C. 154(b) by 896 days.

(21) Appl. No.: 13/231,124

(22) Filed: Sep. 13, 2011

(65) Prior Publication Data

US 2012/0000749 A1 Jan. 5, 2012

Related U.S. Application Data

(62) Division of application No. 12/428,672, filed on Apr. 23, 2009, now Pat. No. 8,047,354.

(Continued)

(51) Int. Cl.
*B65G 45/22* (2006.01)
*C03B 35/24* (2006.01)
*B65G 49/06* (2006.01)

(52) U.S. Cl.
CPC ........ *B65G 49/063* (2013.01); *B65G 2249/02* (2013.01); *B65G 2249/04* (2013.01)

(58) Field of Classification Search
USPC ........ 198/495, 617, 836.1; 414/676; 384/12
See application file for complete search history.

(56) References Cited

U.S. PATENT DOCUMENTS

| 3,346,360 A | 10/1967 | Pierce et al. ............ 65/273 |
| 3,362,806 A | 1/1968 | Brewin et al. ............ 65/114 |

(Continued)

FOREIGN PATENT DOCUMENTS

| CN | 97190230.5 | 5/1998 | ......... C03B 27/048 |
| CN | 1578749 A | 2/2005 | |

(Continued)

OTHER PUBLICATIONS

State Intellectual Property Office of The People's Republic of China; Search Report; Issued: Jan. 21, 2013; pp. 1-2.

(Continued)

*Primary Examiner* — Douglas Hess
(74) *Attorney, Agent, or Firm* — Maurice M. Klee; Jeffrey A. Schmidt

(57) ABSTRACT

Non-contact, liquid-ejecting bearings (3) are provided for conveying flexible glass sheets (13), such as LCD substrates, at high conveyance speeds, e.g., speeds of 15 meters/minute and above. The operating parameters and physical properties of the bearings satisfy at least one of the following conditions: (a) the average flow rate from the bearing's orifices (22) is in the range of 100-800 milliliters/minute/orifice; (b) the orifices' average horizontal pitch (P) is in the range of 20-55 millimeters; and/or (c) the orifices' average size (e.g., $D_o$) is in the range of 1.0-4.5 millimeters. The bearings (3) can reduce the time-averaged, peak-to-peak variation in the spacing between a LCD substrate (13) traveling at 15 meters/minute and the face (20) of the bearing (3) to less than 100 microns, thus reducing the chances that the bearing (3) will lose control of the substrate (13) or that the substrate (13) will hit the bearing (3).

9 Claims, 10 Drawing Sheets

Related U.S. Application Data

(60) Provisional application No. 61/100,486, filed on Sep. 26, 2008.

(56) References Cited

U.S. PATENT DOCUMENTS

| | | | |
|---|---|---|---|
| 3,485,616 A | 12/1969 | Nitschke | 65/182.2 |
| 3,734,567 A | 5/1973 | Fong | 406/86 |
| 4,010,981 A | 3/1977 | Hodge | 406/88 |
| 4,828,434 A * | 5/1989 | Fairman et al. | 406/88 |
| 5,027,941 A * | 7/1991 | Lenhardt | 198/721 |
| 5,332,080 A | 7/1994 | Lenhardt et al. | 198/497 |
| 5,565,040 A | 10/1996 | Donlan et al. | 134/26 |
| 7,077,019 B2 | 7/2006 | Weiss et al. | 73/865.8 |
| 7,108,123 B2 | 9/2006 | Zeidler et al. | 198/493 |
| 7,207,250 B2 | 4/2007 | Lisec | 83/152 |
| 7,513,716 B2 * | 4/2009 | Hayashi et al. | 406/88 |
| 7,530,778 B2 | 5/2009 | Yassour et al. | 414/676 |
| 7,722,256 B2 | 5/2010 | Brackley et al. | 384/12 |
| 7,740,525 B2 * | 6/2010 | Lisec | 451/364 |
| 7,837,799 B2 | 11/2010 | Bangert et al. | 118/729 |
| 7,891,066 B2 | 2/2011 | Aoki et al. | 29/38.9 |
| 7,927,045 B2 * | 4/2011 | Kim et al. | 406/88 |
| 8,047,354 B2 * | 11/2011 | Kudva et al. | 198/617 |
| 8,113,761 B2 * | 2/2012 | Ahn et al. | 414/676 |
| 2005/0011229 A1 | 1/2005 | Lisec | 65/182.2 |
| 2005/0040338 A1 | 2/2005 | Weiss et al. | 250/358.1 |
| 2005/0126605 A1 | 6/2005 | Yassour et al. | 134/34 |
| 2005/0199493 A1 | 9/2005 | Bangert et al. | 204/298.23 |
| 2006/0017676 A1 | 1/2006 | Bowers et al. | 345/87 |
| 2006/0033899 A1 | 2/2006 | Hazelton et al. | 355/53 |
| 2006/0054774 A1 | 3/2006 | Yassour et al. | 248/631 |
| 2006/0219605 A1 | 10/2006 | Devitt | |
| 2007/0271756 A1 | 11/2007 | Aoki et al. | 29/281.5 |
| 2008/0268753 A1 | 10/2008 | Ishikawa et al. | |

FOREIGN PATENT DOCUMENTS

| | | | |
|---|---|---|---|
| CN | 1566004 A | 9/2008 | |
| JP | 1993036658 | 2/1993 | H01L 21/304 |
| JP | 1998158866 | 6/1998 | C23F 1/08 |
| JP | 2001213517 | 8/2001 | B65G 49/07 |
| JP | 2002308422 A | 10/2002 | |
| JP | 2003063643 | 3/2003 | |
| JP | 2003063643 A | 3/2003 | |
| JP | 2004167833 | 6/2004 | B28D 5/00 |
| JP | 2004196435 A | 7/2004 | |
| JP | 2004273574 A | 9/2004 | |
| JP | 2006312511 | 11/2006 | |
| JP | 2007246287 | 9/2007 | B65G 49/06 |
| JP | 2008202146 A | 9/2008 | |
| JP | 2008270818 | 11/2008 | |
| TW | 200811021 A | 3/2008 | |
| TW | 200845276 A | 11/2008 | |

OTHER PUBLICATIONS

Chinese Second Office Action CN200980147768.9 Dated Dec. 20, 2013, Chinese Patent Office, 11 Pgs.
International Search Report and Written Opinion PCT/US2009/058537 Dated Jan. 25, 2010.
Japanese Office Action JP2011529299 Dated Jun. 3, 2013, Japanese IP Office, 13 Pgs.
Japanese Office Action JP2014094502 (A) Dated Jun. 22, 2015, Japanese Patent Office, 12 Pgs.
Korean Non Final Office Action KR1020157033103 (B) Dated Feb. 12, 2016, Korean IP Office, 6 Pgs.
Taiwan Office Action TW101129567 (A) Dated Jun. 26, 2014, Taiwan IP Office, 7 Pgs.
Taiwan Search Report TW098133064 Dated Jun. 18, 2012, Taiwan Patent Office.
Korean Final Office Action KR1020117009036 Dated Sep. 1, 2015, Korean IP Office, 8 Pgs.
Korean Final Office Action KR1020147033177 (A) Dated May 11, 2016, Korean IP Office, 6 Pgs.
Korean Non Final Office Action KR1020117009036 Dated Oct. 10, 2014, Korean IP Office, 7 Pgs.
Korean Non Final Office Action KR1020117009036 Dated Feb. 3, 2015, Korean IP Office, 9 Pgs.
Korean Non Final Office Action KR1020147033177 (A) Dated Sep. 15, 2015, Korean IP Office, 7 Pgs.

* cited by examiner

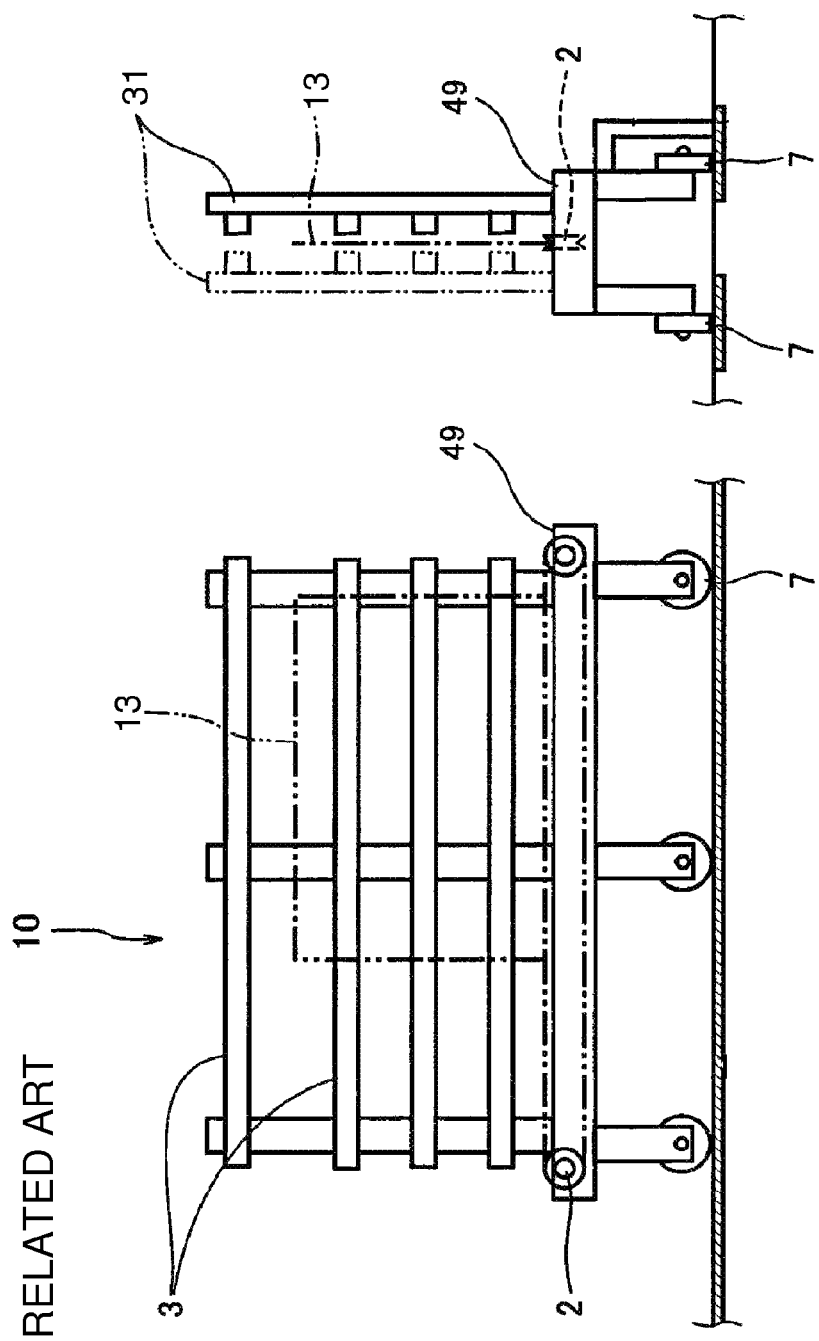

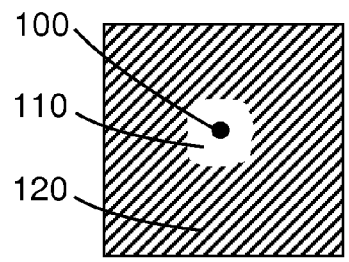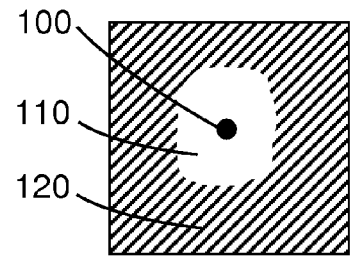
FIG. 2A  FIG. 2B
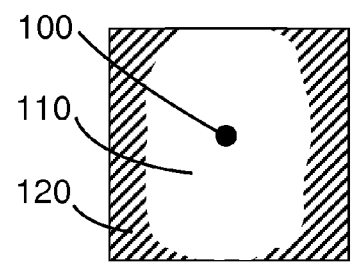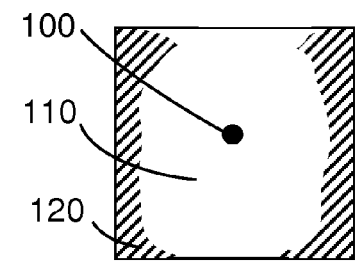
FIG. 2C  FIG. 2D
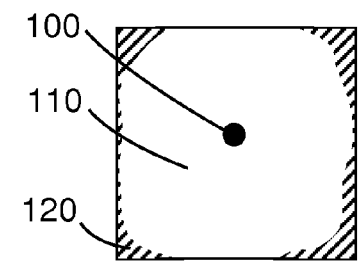
FIG. 2E

LIQUID-EJECTING BEARINGS FOR TRANSPORT OF GLASS SHEETS

CROSS-REFERENCE TO RELATED APPLICATIONS

This is a divisional application and claims the benefit of priority under 35 U.S.C. §120 of U.S. patent application Ser. No. 12/428,672, filed on Apr. 23, 2009, entitled, "Liquid-Ejecting Bearings for Transport of Glass Sheets", which in turn claims the benefit of priority under 35 U.S.C. §119 of U.S. Provisional Application Ser. No. 61/100,486, filed on Sep. 26, 2008, the contents of each of which are relied upon and incorporated herein by reference in their entireties.

FIELD

This invention relates to methods and apparatus for transporting glass sheets, e.g., the glass sheets used as substrates in the manufacture of liquid crystal displays (LCDs). More particular, the invention relates to transporting glass sheets without mechanical contact with the sheet's major surfaces.

BACKGROUND

The process of manufacturing substrates for liquid crystal displays includes a number of steps in which glass sheets need to be supported and conveyed without damage to the sheet's major surfaces and, in particular, without damage to the sheet's "quality" surface upon which components of the display, e.g., thin film transistors and color filters, will be formed. For example, during the substrate manufacturing process, sheets need to be cut to size, edge ground, washed, and packaged and shipped or otherwise provided to the display manufacturer. Not only does the sheet need to be transported between the stations at which these steps are performed, but in some cases, the sheet also needs to be turned (rotated) during a step.

As sheet size has grown from a length of 1 meter to greater than 2 meters without a corresponding increase in sheet thickness, the lateral stiffness of the sheet has significantly decreased. At the same time, transport speed requirements have either remained constant or increased. Thus, the problem of transporting glass substrates for liquid crystal displays as it exists today can be described as trying to move a large glass sheet whose mechanical properties are not unlike those of tissue paper at high speed without touching the major surfaces of the sheet.

The present invention addresses this problem by providing non-contact bearings which eject a liquid (e.g., water) against at least one of the sheet's major surfaces in patterns and at rates which stabilize the sheet and thus reduce the sheet's transverse movement during transport, i.e., the sheet's movement in a direction orthogonal to the direction of transport. In this way, large and thin sheets of glass can be safely transported at high speeds.

SUMMARY

In accordance with a first aspect, the invention provides a method for conveying a glass sheet (13) in a substantially vertical orientation including:

(a) providing a moving conveyor (2) configured to contact an edge of the sheet (13) and move the sheet (13) at a conveyance speed;

(b) providing a non-contact bearing (3) configured to eject liquid (40) against a portion of a major surface of the sheet (13); and (c) contacting the edge of the sheet (13) with the moving conveyor (2) and moving the sheet (13) at the conveyance speed while ejecting liquid (40) from the non-contact bearing (3) against the portion of the major surface of the sheet (13);

wherein the non-contact bearing (3) includes a plurality of orifices (22) which eject the liquid (40) against the portion of the major surface of the sheet (13) and the method has at least one of the following characteristics:

(i) the rate at which the liquid (40) is ejected from the non-contact bearing (3) averaged over the orifices (22) is in the range of 100-800 milliliters/minute/orifice; or (ii) the orifices' (22) average horizontal pitch (P) is in the range of 20-55 millimeters; or (iii) the orifices' (22) average size ($D_O$) is in the range of 1.0-4.5 millimeters.

In accordance with a second aspect, the invention provides a method for conveying a glass sheet (13) in a substantially vertical orientation including:

(a) providing a moving conveyor (2) configured to contact an edge of the sheet (13) and move the sheet (13) at a conveyance speed;

(b) ejecting a liquid (40) against an upper portion of a major surface of the glass sheet (13); and (c) ejecting a liquid (40) against a lower portion of the major surface of the glass sheet (13);

wherein:

(i) the upper portion is vertically above the lower portion; and (ii) the amount of liquid (40) ejected against the upper portion per unit time is more than the amount of liquid (40) ejected against the lower portion per unit time.

In accordance with a third aspect, the invention provides a non-contact bearing (3) for use in transporting a glass sheet (13), the bearing (3) having a front surface (20) which has a plurality of orifices (22), the front surface (20) facing the glass sheet (13) and the orifices (22) ejecting liquid (40) towards a major surface of the glass sheet (13) during use of the bearing (3), wherein:

(a) the orifices (22) are distributed on the front surface (20) to form at least one row (23,24,25) that is oriented horizontally during use of the bearing (3); and (b) the orifices (22) have an average horizontal pitch P which satisfies the relationship:

$$20 \leq P \leq 55,$$

where P is in millimeters.

The reference numbers used in the above summaries of the various aspects of the invention are only for the convenience of the reader and are not intended to and should not be interpreted as limiting the scope of the invention. More generally, it is to be understood that both the foregoing general description and the following detailed description are merely exemplary of the invention and are intended to provide an overview or framework for understanding the nature and character of the invention.

Additional features and advantages of the invention are set forth in the detailed description which follows, and in part will be readily apparent to those skilled in the art from that description or recognized by practicing the invention as described herein. The accompanying drawings are included to provide a further understanding of the invention, and are incorporated in and constitute a part of this specification. It is to be understood that the various features of the invention disclosed in this specification and in the drawings can be used in any and all combinations.

BRIEF DESCRIPTION OF THE DRAWINGS

FIGS. 1A and 1B are schematic drawings of conveying apparatus for a glass sheet employing an array of non-contact, liquid-ejecting bearings. FIG. 1A is a front view and FIG. 1B is a side view.

FIGS. 2A-E show calculated plots of the pressure distribution produced on a glass sheet by the flow of liquid out of an orifice for various orifice-to-sheet spacings and liquid flow rates. Table 1 sets forth the particular parameters used for each of FIGS. 2A through 2E.

FIG. 3A is a front view and FIG. 3B is a side view.

DETAILED DESCRIPTION OF THE PREFERRED EMBODIMENTS

Figures 3A, 3B:
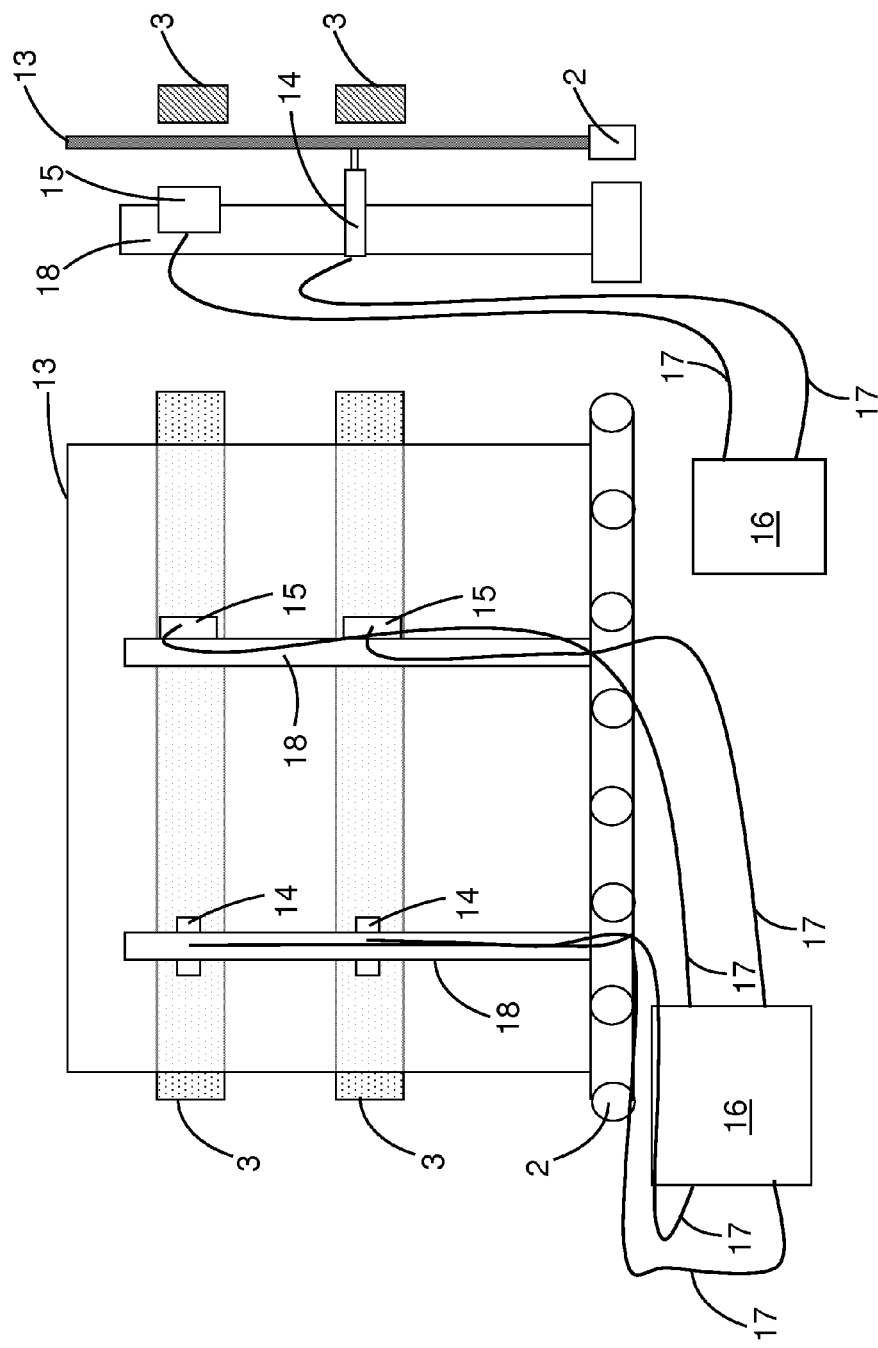
FIGS. 3A and 3B are schematic drawings of apparatus used in testing the effects of various parameters on the conveyance of glass sheets using non-contact, liquid-ejecting bearings.

As discussed above, non-contact, liquid-ejecting bearings for transporting glass sheets in a vertical or near vertical orientation are provided. The bearing ejects (dispenses) a liquid (e.g., water) against a portion of a major surface of the glass sheet. The liquid is preferably water, although other liquids may be used if desired. The liquid may include one or more additives, such as a biocide to prevent bacterial growth in cases where recycled water is used.

The glass sheet is preferably suitable for use as a substrate in the manufacture of flat panel displays, such as LCD displays. At present, the largest substrates being provided to flat panel display manufacturers are known as "Gen 10" substrates and have dimensions of 2850 mm×3050 mm×0.7 mm. The non-contact bearings disclosed herein can be used with these substrates, as well as with larger substrates that may be developed in the future and smaller substrates which have been developed in the past.

FIG. 1 shows a representative embodiment of apparatus 10 for conveying a glass sheet 13 using non-contact, liquid-ejecting bearings 3. As shown in this figure, an array of bearings 3 are carried by supports 31. The supports, in turn, are carried by platform 49 which may include casters 7 for transporting the apparatus to different locations in a manufacturing plant.

The number of non-contact bearings used in any particular application, as well as the lengths of the individual bearings, will depend on the size of the glass sheet being conveyed, e.g., in the case of Gen 10 substrates, a preferred embodiment employs an array having on the order of 10 bearings, each bearing having a length of 1.5 meters. More or less bearings, as well as longer and shorter bearings, can, of course, be used as desired. For example, more bearings can be used if a glass sheet is being transported in a portrait orientation as opposed to a landscape orientation. In general terms, the bearings preferably have a vertical height in the range of 50-150 millimeters and, when an array of bearings is used, the vertical spacing between the bearings is preferably in the range of 200-400 millimeters.

Supports 31 may hold the bearings in a vertical orientation as shown in FIG. 1 or at an angle displaced from vertical, e.g., at an angle in the range of 1-20° from vertical. (As used herein, the phrase "a substantially vertical orientation" means an orientation between 0° and 20° from vertical.) A vertical orientation is generally preferred.

As shown in FIG. 1, platform 49 includes conveyor 2, e.g., a V-shaped or U-shaped belt, for engaging the bottom edge of sheet 13. The conveyor is driven by, for example, an electric motor (not shown) at the desired conveyance speed for the glass sheet. The conveyance speed will depend on the particular application. Preferably, the conveyance speed is equal to or greater than 15 meters/minute. For example, the conveyance speed may be in the range of 15 to 22 meters/minute, although slower speeds, e.g., speeds down to 7 meters/minute can be used if desired.

Figure 4:
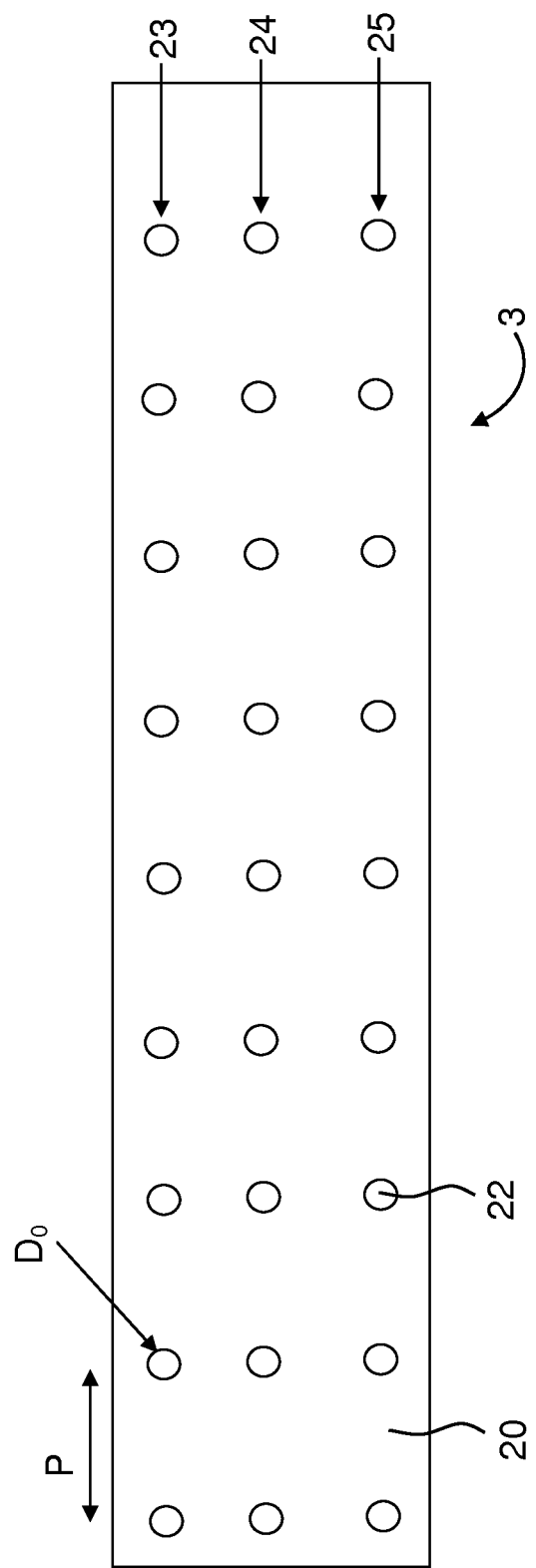
FIG. 4 shows the front face of a non-contact, liquid-ejecting bearing.

FIG. 4 shows the front surface (sheet facing surface) 20 of a representative liquid-ejecting bearing 3. As can be seen in this figure, the front surface includes a plurality of orifices 22 arranged, in this case, in three rows 23,24,25, with each row having the same number of orifices and with the orifices in adjacent rows being aligned vertically. Also, in this figure, the orifices have a uniform size (i.e., a uniform diameter $D_0$). This arrangement has been found to work successfully in practice, but numerous variations of the arrangement can be used if desired. As representative examples, the liquid-ejecting bearing can include more or less than three rows of orifices, the various rows can have different numbers of orifices, the orifices in adjacent rows can be staggered instead of vertically aligned, and the orifice sizes and the horizontal spacings (pitches) between some or all of the orifices can have different values. Also, the orifices need not be circular, in which case rather than being the orifice's diameter, the orifice's size is its maximum cross-sectional dimension.

During use, the orifices of bearing 3 are connected to a source of pressurized liquid. For example, a pump can be used to feed pressurized liquid from a reservoir to a plenum which distributes the liquid to the various orifices, e.g., through flexible tubes connected to the entrance ends of the orifices on the back surface of the bearing. A wide variety of commercially-available equipment, well known to those skilled in the art, can be used to provide the pressurized liquid. Alternatively, customized equipment can be constructed if desired.

The non-contact bearing(s) may be used on only one side of the sheet (see the solid lines in FIG. 1B) or may be disposed on both sides of the sheet (see the solid and dashed lines in FIG. 1B), depending upon the operation that is to be performed on the sheet. For example, the bearing(s) may be used for sheet support and conveyance during the cut-to-size, sheet rotation, sheet transport, sheet grinding, and sheet washing steps of the substrate manufacturing process. Examples of these and other applications for the bearing(s) can be found in U.S. Patent Application Publication No. US 2007/0271756, the contents of which are incorporated herein by reference in their entirety.

During use, the liquid emitted from the bearing(s) forms a membrane or film that supports the glass sheet so that it does not contact the front surface of the bearing(s). More particularly, the bearing(s) employ localized flow acceleration to create a negative pressure and hence a suction force to hold the glass sheet against the bearing during transport. FIGS. 2A-E illustrate the phenomena being employed.

In these figures, 100 is an area of high positive pressure (the impingement point of the liquid), 110 is a region of low negative pressure resulting from local acceleration of the liquid tangential to the glass surface, and 120 is a region of low positive pressure at the periphery. For purposes of illustration, the positive and negative regions shown in this figure were calculated for a single orifice without surrounding orifices. The area shown in each panel of FIGS. 2A-E is 50 mm×50 mm. The calculations were performed using the commercially-available fluid dynamics program sold under the FLUENT trademark by ANSYS, Inc. (Canonsburg, Pa.). Other programs, including non-commercial programs, can, of course, be used to make the calculations shown in FIG. 2, as well as the other calculations discussed herein.

FIGS. 2A-E show the distributions of positive and negative pressures for various combinations of 1) the spacing between the exit end of the orifice and the substrate's surface and 2) the flow rate through the orifice. Table 1 sets forth the specific values used, as well as the total integrated pressure (total force) at the surface of the substrate. A positive total force means that the sheet is being pushed away from the orifice (repelled from the bearing), while a negative total force means that the sheet is being pulled towards the orifice (attracted to the bearing).

As illustrated by FIGS. 2A-E and Table 1, positive and negative net forces can be achieved for various combinations of orifice-to-sheet spacings and flow rates. In particular, this data shows that positive forces (repulsive forces) can be achieved for close spacings and negative forces (attractive forces) for large spacings. As a result, an equilibrium point (equilibrium spacing) can be identified at which the sheet is neither pulled toward nor pushed away from the orifice. For orifice-to-sheet spacings smaller than the equilibrium spacing, the sheet is pushed away from the orifice back towards the equilibrium point. For orifice-to-sheet spacings greater than the equilibrium spacing, the sheet is pulled back towards the equilibrium point. In this way, the orifice-to-sheet spacing will hover around the equilibrium spacing.

In particular, the orifice-to-sheet spacing will hover around the equilibrium spacing as the sheet is transported past the orifice. Such transporting will cause the spacing between the sheet and the orifice to change over time as a result of 1) vibration of the moving sheet and/or 2) bowing, waviness, warp, or other non-flat surface characteristics of the sheet. Because the net force applied to the sheet by the liquid ejected from the orifice changes sign at the equilibrium point, these variations in the orifice-to-sheet spacing can be accommodated by setting the orifice parameters, including the liquid flow rate, at values which produce an equilibrium point and attractive/repulsive forces on either side of the equilibrium point that can hold the sheet on the bearing notwithstanding the inevitable variations in the orifice-to-sheet spacing.

The data of FIGS. 2A-E is for a single orifice. In practice, a single orifice will not generate sufficient force to hold a moving glass sheet on a liquid-ejecting bearing. Rather, an array of orifices may be used. More generally, arrays of liquid-ejecting bearings, e.g., two or more liquid-ejecting bearings arranged above one another (see FIG. 1), are typically used in transporting glass sheets, especially as the size of the sheet increases. Each liquid-ejecting bearing will have its own array of orifices, which may be the same for all of the bearings or may differ between bearings, if desired.

The effects of an array of orifices on a glass sheet were found to be substantially more complex than the effects of a single orifice. Similarly, an array of liquid-ejecting bearings was found to exhibit more complex behavior than a single liquid-ejecting bearing. To study these effects, experiments were performed using equipment of the type shown schematically in FIG. 3. In this figure, 13 is the glass sheet, 2 is a conveyor for the sheet, 3 is a liquid-ejecting bearing, 14 is a force transducer, 15 is a position sensor, 18 is a transducer/sensor support, 17 are leads to the transducers and sensors, and 16 is equipment for recording the output of the transducers and sensors.

FIG. 4 shows a representative liquid-ejecting bearing 3 used in the experiments. In addition to the structure of the bearing, the figure also shows parameters that were varied during the experiments, i.e., the average horizontal pitch parameter P, i.e., the average center-to-center spacing between orifices in the direction of motion of the glass sheet, and the average orifice size parameter, specifically, in this case, the average diameter $D_0$ of the orifices.

Figure 5:
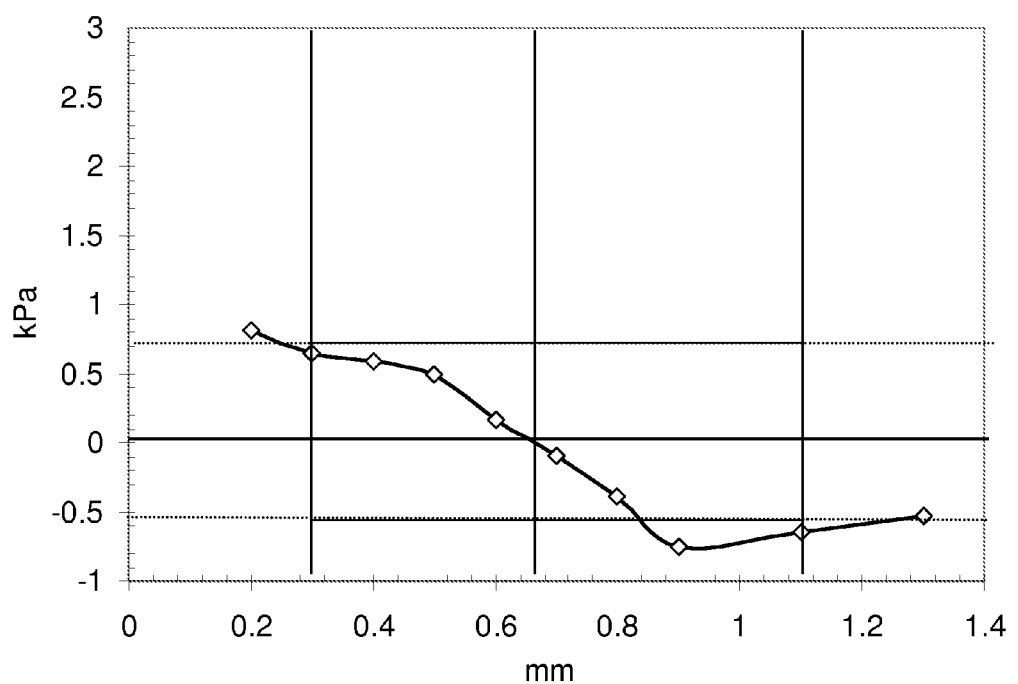
FIG. 5 is a plot of pressure/orifice in kilopascals (kPa) at the surface of a glass sheet (y-axis) versus spacing in millimeters (mm) between the glass sheet and the front face of a non-contact, liquid-ejecting bearing (x-axis). The shaded area of this figure illustrates a representative operating window for use of the bearing.

FIG. 5 is a plot of the average pressure in kilopascals (kPa) applied to a glass sheet by an orifice of a bearing's array of orifices versus the spacing in millimeters (mm) between the front surface of the liquid-ejecting bearing and the glass sheet (or, equivalently, between the exit ends of the orifices and the glass sheet since the exit ends of the orifices are typically flush with the surface of the bearing). In this figure, as well as in FIGS. 6-8, positive pressures represent repulsion between the bearing and the sheet and negative pressures represent attraction. The hatched portion of this plot shows a representative operating window for the bearing, i.e., the portion of the pressure-versus-spacing curve over which high speed transport of glass sheets can be performed reliably using the bearing.

Figure 6:
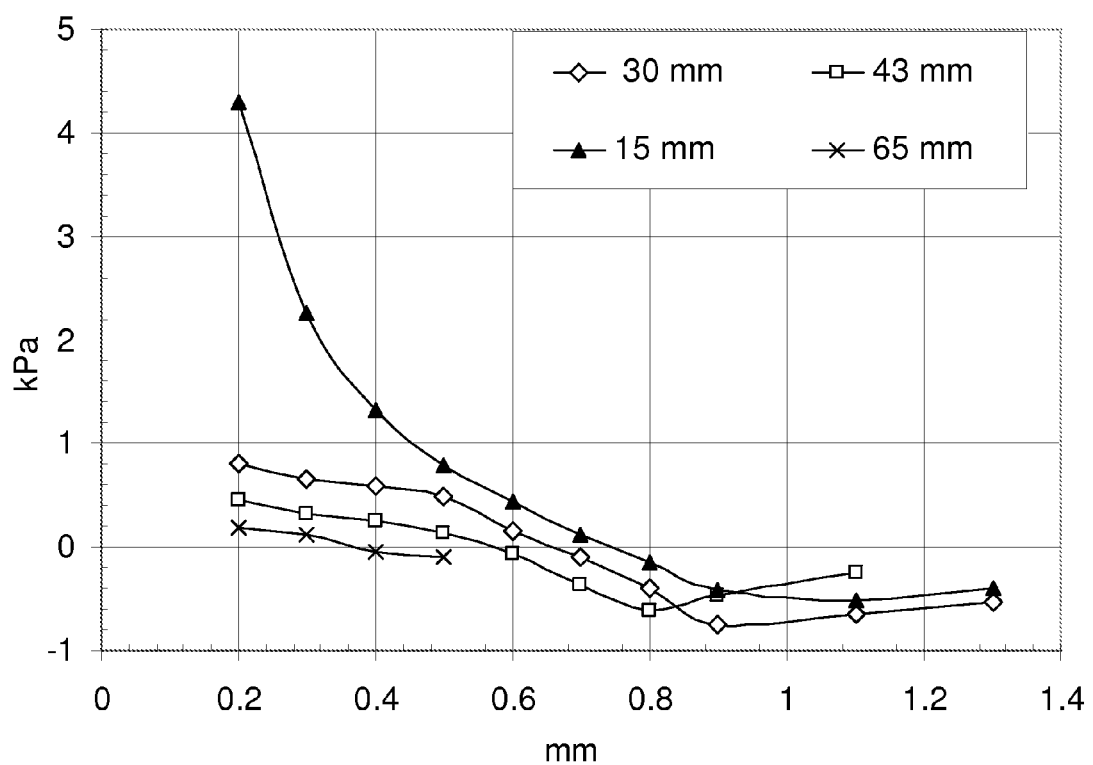
FIG. 6 is a plot of pressure/orifice in kilopascals (kPa) at the surface of a glass sheet (y-axis) versus spacing in millimeters (mm) between the glass sheet and the front face of a non-contact, liquid-ejecting bearing (x-axis) for average horizontal pitches of 15, 30, 43, and 65 millimeters.
Figure 7:
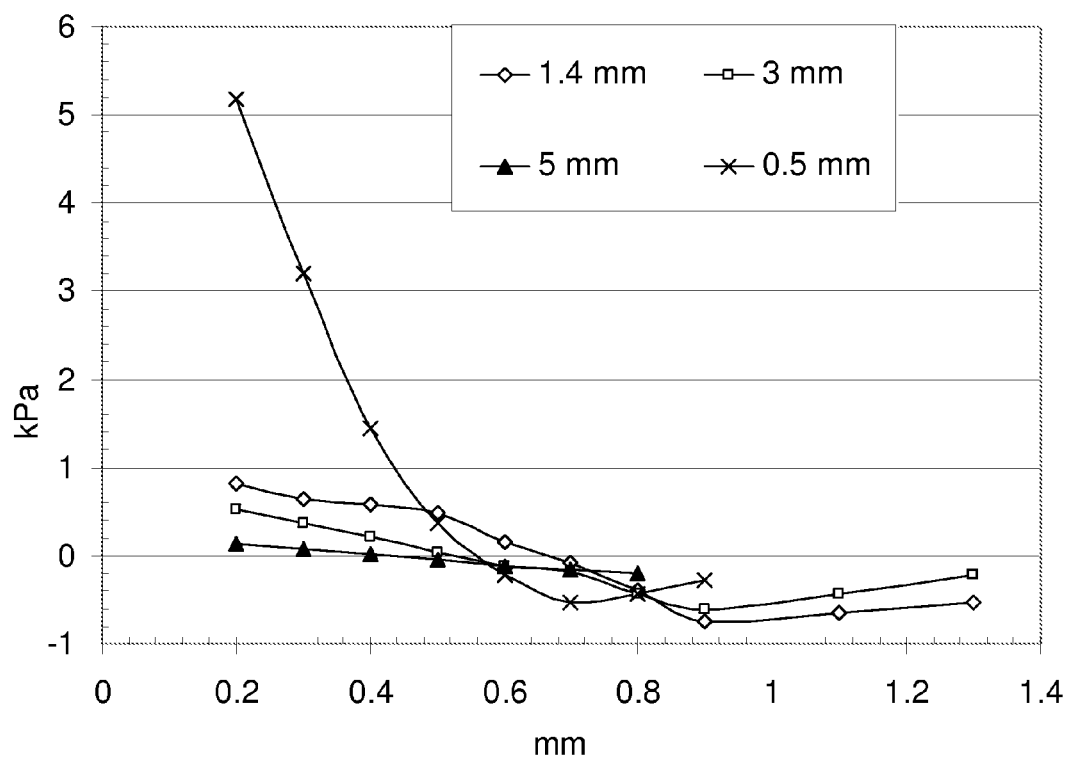
FIG. 7 is a plot of pressure/orifice in kilopascals (kPa) at the surface of a glass sheet (y-axis) versus spacing in millimeters (mm) between the glass sheet and the front face of a non-contact, liquid-ejecting bearing (x-axis) for average orifice sizes of 0.5, 1.4, 3.0, and 5.0 millimeters.
Figure 8:
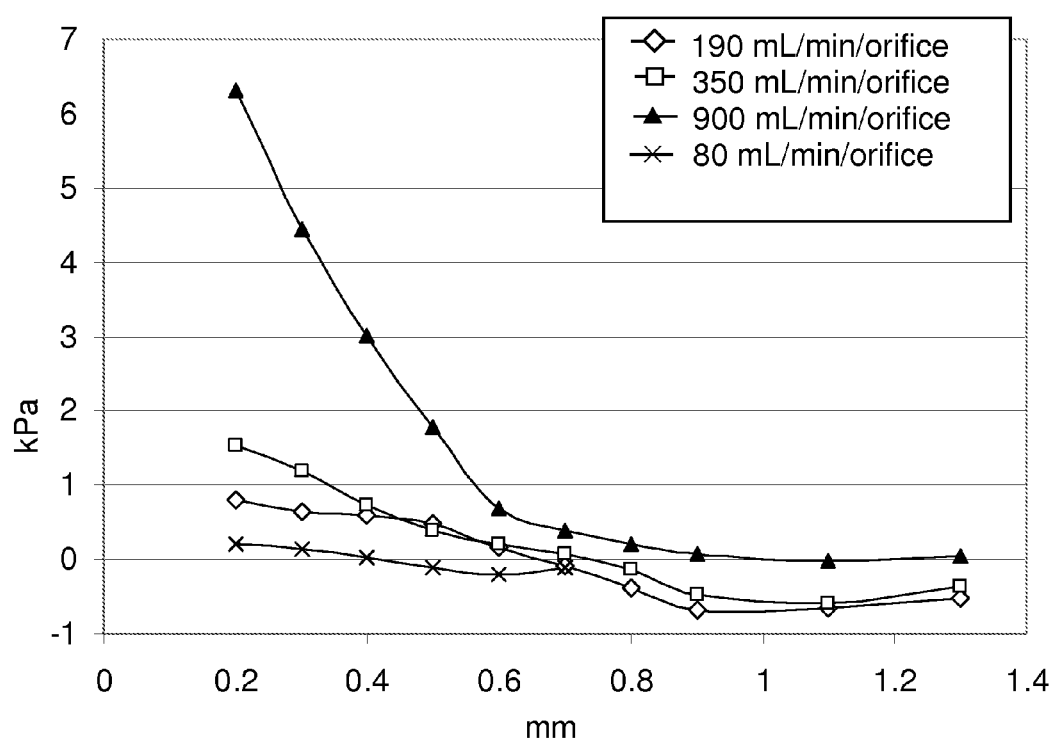
FIG. 8 is a plot of pressure/orifice in kilopascals (kPa) at the surface of a glass sheet (y-axis) versus spacing in millimeters (mm) between the glass sheet and the front face of a non-contact, liquid-ejecting bearing (x-axis) for average flow rates of 80, 190, 350, and 900 milliliters/minute/orifice.

Using equipment of the type shown in FIG. 3 and a bearing of the type shown in FIG. 4, pressure-versus-spacing curves were determined for a wide range of potential parameters. As a result of these experiments, it was found that the key parameters are: 1) the average horizontal pitch between orifices, 2) the average size of the orifices, and 3) the average flow rate through the orifices, where in each case, the averages are over all of the orifices of the bearing. It was further found that specific ranges of values for these parameters produced practical operating windows of the type shown in FIG. 5. FIGS. 6, 7, and 8 show representative data which illustrates the ranges for average horizontal pitch, average orifice size, and average flow rate, respectively.

As shown in FIG. 6, an average horizontal pitch of 15 millimeters (solid triangle data points) produced unacceptably large repulsive forces on the glass sheet as the sheet approached the surface of the bearing. Consequently, the sheet would tend to fly off of the bearing since the attractive forces were insufficient to restrain the sheet once it had, in effect, bounced off of the bearing as a result of an inward movement towards the bearing. On the other hand, an average horizontal pitch of 65 millimeters (x data points) produced insufficient repulsive force so that there would be no guarantee that the sheet would not be damaged during use as a result of contact with the bearing.

Both an average horizontal pitch of 43 millimeters (open square data points) and an average horizontal pitch of 30 millimeters (open diamond data points) produced desirable pressure-versus-spacing curves, with the 30 millimeter average horizontal pitch being somewhat better than the 43 millimeter value since the magnitudes of the repulsive pressures and at least some of the attractive pressures for the 30 millimeter pitch were larger than those of the 43 millimeter pitch. Based on this and similar data, it was determined that the average horizontal pitch should be in the range of 20 to 55 millimeters, preferably 25 to 50 millimeters, and more preferably 30 to 40 millimeters (e.g., approximately 35 millimeters), where, in each case, the end points of the ranges are included within the range.

FIG. 7 shows data for the average orifice size parameter. In this case, an average orifice size of 5 millimeters (solid triangular data points) was found to produce too small a repulsive pressure at small bearing to sheet spacings and an average orifice size of 0.5 millimeters (x data points) was found to produce too large a repulsive pressure.

Both an average orifice size of 3 millimeters (open square data points) and one of 1.4 millimeters (open diamond data points) produced desirable pressure-versus-spacing curves, with the 1.4 millimeter average orifice size being somewhat better than the 3 millimeter size since the magnitudes of both the repulsive and attractive pressures for the 1.4 millimeter average orifice size were larger than those of the 3 millimeter size. Based on this and similar data, it was determined that the average orifice size should be in the range of 1.0 to 4.5 millimeters, preferably 1.0 to 3.5 millimeters, and more preferably 1.25 to 2.25 millimeters, where, in each case, the end points of the ranges are included within the range.

FIG. 8 shows data for average flow rate. In this case, an average flow rate of 900 milliliters/minute/orifice (solid triangular data points) was found to produce too large a repulsive pressure at small bearing to sheet spacings and an average flow rate of 80 milliliters/minute/orifice (x data points) was found to produce too small a repulsive pressure.

Both an average flow rate of 350 milliliters/minute/orifice (open square data points) and 190 milliliters/minute/orifice produced desirable pressure-versus-spacing curves, with the 190 milliliters/minute/orifice average flow rate being somewhat better than the 350 milliliters/minute/orifice average flow rate since lower average flow rates mean less liquid consumption which, in turn, means smaller and thus less expensive equipment is needed to supply the liquid. Based on this and similar data, it was determined that the average flow rate should be in the range of 100 to 800 milliliters/minute/orifice, preferably 125 to 300 milliliters/minute/orifice, and more preferably 150 to 190 milliliters/minute/orifice, where, in each case, the end points of the ranges are included within the range.

Each of these three key parameters, i.e., average horizontal pitch, average orifice size, and average flow rate, provides benefits to the system and thus for some applications, only one or two of the parameters will be in the ranges discussed above. In general terms, the average flow rate parameter is most important, followed by the horizontal pitch and average orifice size parameters in that order.

For many applications, the average horizontal pitch, average orifice size, and average flow rate parameters are preferably all within the above designated ranges, more preferably, all within the above preferred ranges, and most preferably, all within the above more preferred ranges. In keeping with this approach, the data shown for each of FIGS. 6, 7, and 8 is for the "open diamond" parameter values of the other two figures. Thus, for FIG. 6, the average orifice size is 1.4 millimeters and the average flow rate is 190 milliliters/minute/orifice, while for FIG. 7, the average horizontal pitch is 30 millimeters and the average flow rate is 190 millimeters/minute/orifice, and for FIG. 8, the average horizontal pitch is 30 millimeters and the average orifice size is 1.4 millimeters.

In addition to the average horizontal pitch, average orifice size, and average flow rate parameters, the total force applied to a major surface of the sheet, i.e., the pressure integrated over the major surface, is preferably within the range of −0.6 Newtons to +0.6 Newtons, where the endpoints of the range are part of the range. The total force will vary over time as the distance between the sheet and the bearing changes, but preferably remains in the above range. The total force is preferably a measured value, but can also be a calculated value based on a simulation of the system using fluid dynamics software such as the FLUENT program discussed above. This total force range can serve as a useful guide in selecting the number, arrangement, sizes, and flow rates of the orifices. In particular, when choosing orifice flow rates, a rate which generates negative forces but not excessive total forces in view of the other parameters of the system (e.g., total number of orifices, orifice spacing, and orifice size) is preferred, i.e., a total force less than or equal to the upper limit of the above range is preferred.

The above ranges for the average horizontal pitch, average orifice size, and average flow rate parameters have been found to provide effective transport of glass sheets with controlled amounts of variation in the spacing between the glass sheet and the front surface of the bearing. In particular, when non-contact, liquid-ejecting bearings having an average flow rate in the range of 100 to 800 milliliters/minute/orifice, an average orifice size in the range of 1.0 to 4.5 millimeters, and an average horizontal pitch in the range of 20 to 55 millimeters, are tested at a conveyance speed of 15 meters/minute using a glass sheet whose modulus is 73 GPa and whose dimensions are 2 meters long, 2 meters high, and 0.7 millimeters thick, the time-averaged spacing between the sheet and the front face of the bearing at all points on the front face of the bearing is in the range of 500-1000 microns and the time-averaged peak-to-peak variation in the spacing at all points on the front face of the bearing is no greater than 100 microns. Such a small variation relative to the average spacing means that the likelihood of any part of the sheet contacting the bearing during transport of the sheet is negligible. It also means that the chances of the sheet becoming disconnected from the bearing is also negligible.

Figure 9:
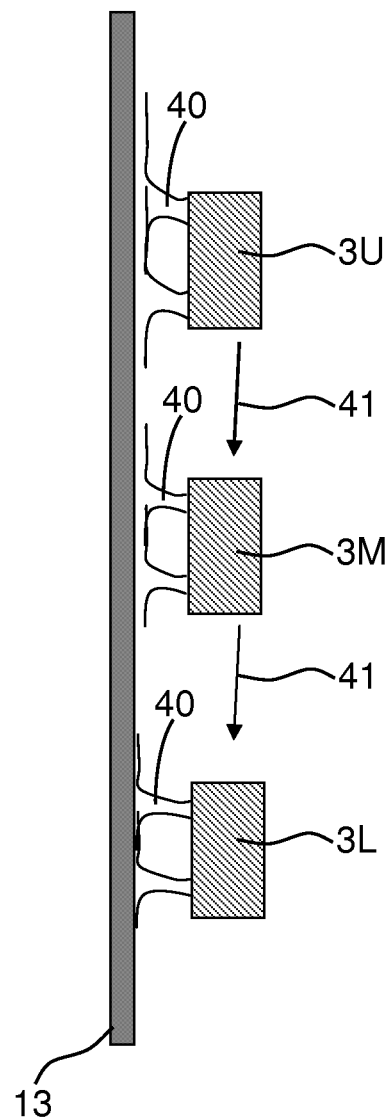
FIG. 9 is a schematic diagram illustrating interaction between individual bearings of an array of non-contact, liquid-ejecting bearings.
Figure 10:
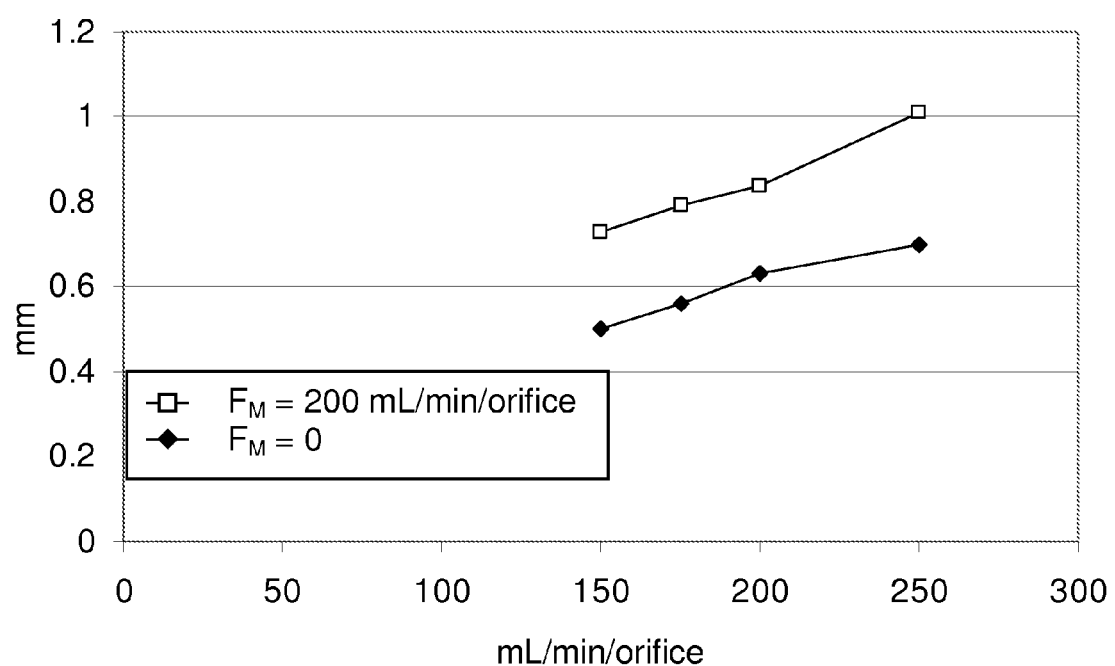
FIG. 10 is a plot of the spacing in millimeters (mm) between a glass sheet and the front face of a non-contact, liquid-ejecting bearing (y-axis) versus average flow rate in milliliters/minute/orifice through the lower of two non-contact, liquid-ejecting bearings (x-axis) for average flow rates of zero and 200 milliliters/minute/orifice through the upper of the two bearings.

As noted above, not only are the phenomena more complex when multiple orifices are involved, but they are also more complex when multiple bearings are used in an array. FIGS. 9 and 10 illustrate the inter-bearing interaction that has been discovered.

In FIG. 9, three bearings 3U, 3M, and 3L eject liquid 40 against a glass sheet 13. As schematically illustrated by arrows 41, in practice, the liquid ejected from bearing 3U interacts with that ejected from bearing 3M, and the liquid ejected from bearing 3M (as well as some of the liquid ejected from bearing 3U) interacts with that ejected from bearing 3L. In particular, it has been found that for equal average flow rates for all three bearings, the spacing between glass sheet 13 and the bearing's front surface is greater for bearing 3M and bearing 3L than for bearing 3U, with the spacing for bearing 3L being the largest of them all. (Recall that because of its thinness, glass sheet 13 is highly flexible so that although bearings 3U, 3M, and 3L may be vertically aligned, the lower parts of the sheet can flex away from bearings 3M and 3L to create the larger spacing.)

FIG. 10 quantifies the effect for a two bearing system, e.g., bearings 3M and 3L in FIG. 9. The horizontal axis in FIG. 10 shows the average flow rate through bearing 3L, while the vertical axis plots the spacing between the front surface of bearing 3L and the glass sheet. The solid diamond data points show the spacing for zero flow through bearing 3M, i.e., $F_M=0$. As shown, the spacing to the sheet increases as the average flow rate through the bearing 3L increases.

The open square data points show the effect of a 200 milliliters/minute/orifice average flow rate through bearing 3M. Again, the spacing between bearing 3L and the sheet increases with the average flow rate through bearing 3L, but all of the values are now shifted upward to larger spacings. Accordingly, to maintain substantially equal spacings between the glass sheet and all of the bearings in a bearing array, the operating parameters and/or physical properties of the bearings need to be different. In particular, the operating parameters and/or the physical properties of the bearings need to differ so that the amount of liquid ejected by the lower bearing is less than the amount of liquid ejected by the upper bearing. This can be accomplished in various ways.

For example, the average liquid flow rate for the lower bearing can be reduced. As one example, using the data of FIG. 10, the combination of a 200 milliliters/minute/orifice average flow rate through bearing 3M and a 150 milliliters/minute/orifice average flow rate through bearing 3L can be seen to produce substantially the same spacing between bearing 3L and the glass sheet as an average flow rate of 250 milliliters/minute/orifice through bearing 3L alone. Similar data can be generated for three or more active bearings, with the average flow rates through the lower bearings being reduced to produce relatively uniform bearing-to-sheet spacings at all bearings. (Note that for some applications, it may be desirable to have unequal spacings which can be achieved by adjusting the average flow rates of the various bearings in accordance with the present disclosure.)

As an alternative to using different flow rates, the physical properties of the bearings can be different. For example, the average horizontal pitch of the lower bearing can be made larger than that of the upper bearing and/or the average orifice size can be made smaller. For many applications, the physical properties approach may be preferable to the flow rate approach since it can avoid the need to individually control/monitor the flow of liquid through the individual bearings.

From the foregoing, it can be seen that non-contact, liquid-ejecting bearings have been provided which can successfully convey flexible glass sheets, e.g., LCD substrates, at high speeds, e.g., speeds of 15 meters/minute and above. To achieve this result, the operating parameters and physical properties of the bearing(s) satisfy one and preferably all of the following conditions: (a) the average flow rate from the bearing's orifices is in the range of 100-800 milliliters/minute/orifice; (b) the orifices' average horizontal pitch is in the range of 20-55 millimeters; and/or (c) the orifices' average size is in the range of 1.0-4.5 millimeters. By means of these conditions, the time-averaged, peak-to-peak variation in the spacing between a LCD substrate traveling at 15 meters/minute and the face of a liquid-ejecting bearing can be reduced to less than 100 microns, thus reducing the chances that the bearing will lose control of the substrate or that the substrate will hit the bearing.

A variety of modifications that do not depart from the scope and spirit of the invention will be evident to persons of ordinary skill in the art from the foregoing disclosure. The following claims are intended to cover the specific embodiments set forth herein as well as modifications, variations, and equivalents of those embodiments.

TABLE 1

| FIG. | Spacing (mm) | Flow Rate (liters/min) | Total Force (Newtons) |
|---|---|---|---|
| 2A | 0.3 | 0.68 | +0.48 |
| 2B | 0.4 | 0.81 | −0.30 |
| 2C | 0.7 | 1.00 | −0.82 |
| 2D | 1.0 | 1.10 | −0.55 |
| 2E | 1.3 | 1.13 | −0.39 |

What is claimed is:

1. A non-contact bearing for use in transporting a glass sheet comprising a front surface which has a plurality of orifices, the front surface facing the glass sheet and the orifices ejecting liquid towards a major surface of the glass sheet during use of the bearing, wherein:
   (a) the orifices are distributed on the front surface to form at least one row that is oriented horizontally during use of the bearing; and
   (b) the orifices have an average horizontal pitch P which satisfies the relationship:

$2 \leq P \leq 55$, where P is in millimeters.

2. The non-contact bearing of claim 1 wherein the orifices have an average size which is in the range of 1.0-4.5 millimeters.

3. The non-contact bearing of claim 2 wherein the non-contact bearing is an upper non-contact bearing, and further comprising:
   a lower non-contact bearing which comprises a second plurality of orifices having a second average size, wherein the second average size is less than the average size.

4. The non-contact bearing of claim 1 wherein the non-contact bearing is an upper non-contact bearing, and further comprising:
   a lower non-contact bearing which comprises a second plurality of orifices having an average horizontal pitch $P_L$, wherein the lower non-contact bearing is vertically below the upper non-contact bearing; and
   wherein, P and $P_L$ satisfy the relationship:

$P_L > P$.

5. The non-contact bearing of claim 4 wherein the upper non-contact bearing and the lower non-contact bearing are any two adjacent members of an array of non-contact bearings.

6. The non-contact bearing of claim 4 wherein the lower non-contact bearing comprises a second front surface which has the second plurality of orifices, the second front surface facing the glass sheet and the second plurality of orifices ejecting liquid towards a major surface of the glass sheet during use of the bearing, wherein:
- (a) the orifices of the second plurality of orifices are distributed on the second front surface to form at least one row that is oriented horizontally during use of the bearing; and
- (b) the average horizontal pitch $P_L$ satisfies the relationship:

$$20 \leq P_L \leq 55,$$

where $P_L$ is in millimeters.

7. The non-contact bearing of claim 6 wherein the orifices of the second plurality of orifices have an average size which is in the range of 1.0-4.5 millimeters.

8. The non-contact bearing of claim 1 further comprising a sheet transportation path along which the glass sheet is transported, and wherein there are orifices on only one side of the sheet transportation path.

9. The non-contact bearing of claim 8 further comprising an array of non-contact bearings disposed along only one side of the sheet transportation path.

* * * * *